March 6, 1951 C. B. RICHEY 2,544,181
TRAILER HITCH FOR TRACTORS
Filed June 29, 1949 3 Sheets-Sheet 1
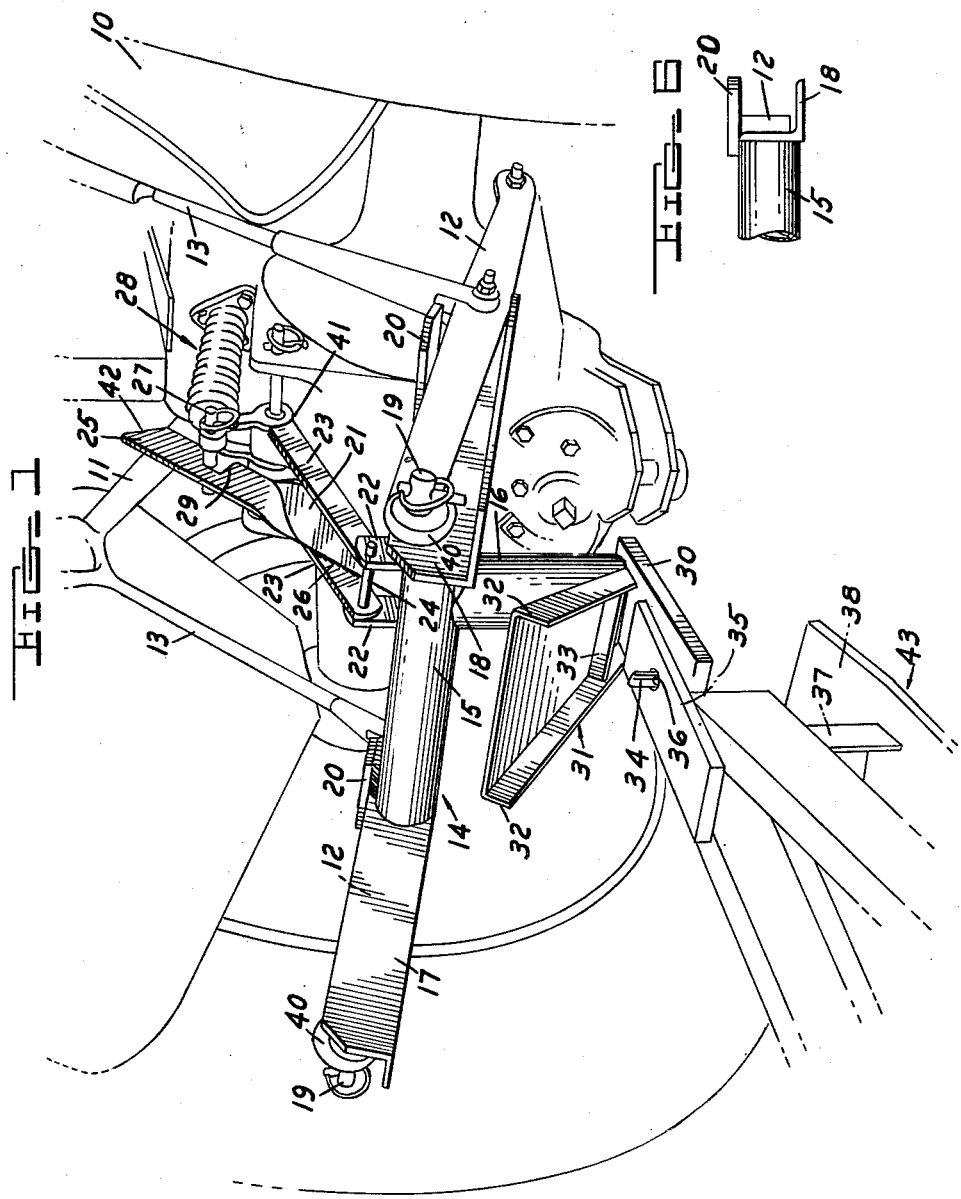
INVENTOR.
CLARENCE B. RICHEY
BY
ATTORNEY

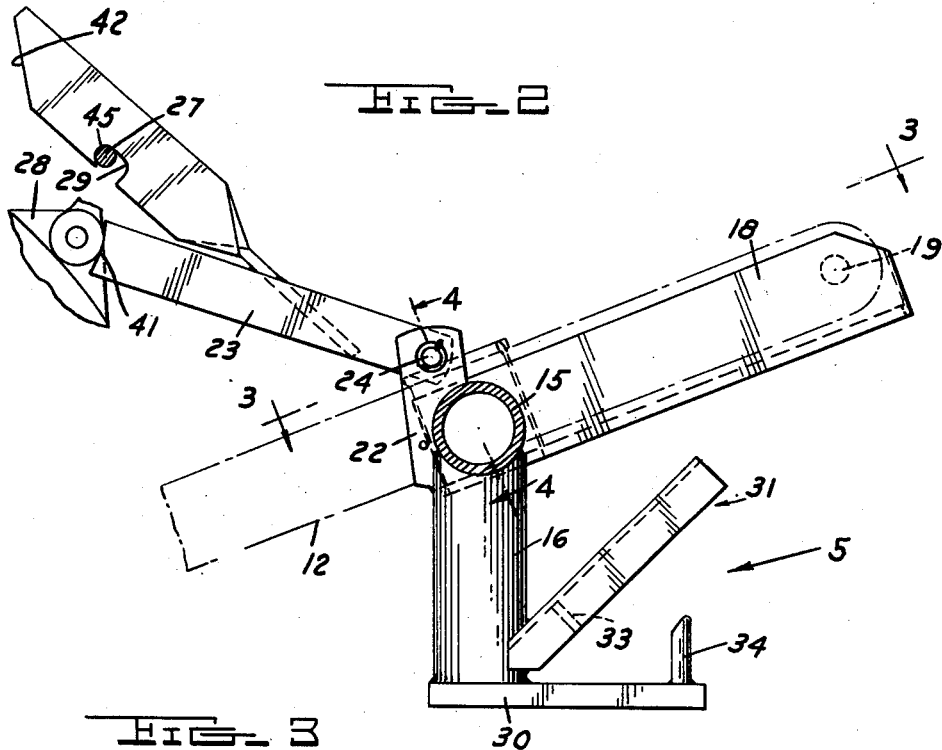
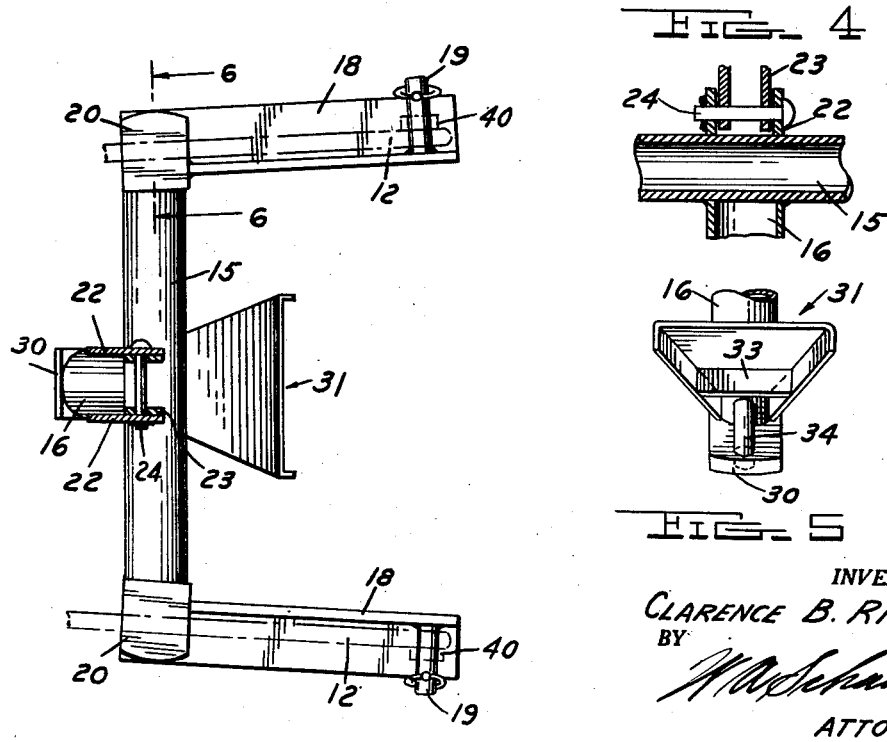

March 6, 1951  C. B. RICHEY  2,544,181
TRAILER HITCH FOR TRACTORS
Filed June 29, 1949  3 Sheets-Sheet 3

INVENTOR.
CLARENCE B. RICHEY
BY
*M. A. Schaich*
ATTORNEY

Patented Mar. 6, 1951

2,544,181

UNITED STATES PATENT OFFICE 2,544,181

TRAILER HITCH FOR TRACTORS

Clarence B. Richey, Royal Oak, Mich., assignor to Dearborn Motors Corporation, Highland Park, Mich., a corporation of Delaware Application June 29, 1949, Serial No. 102,077

7 Claims. (Cl. 280—33.44)

This invention relates to a trailer hitch for a tractor having a hydraulic lifting mechanism.

Coupling and uncoupling farm implements, trailers, wagons or other vehicles to the tractor has usually been a manual operation involving considerable expenditure of effort on the part of the tractor operator. Formerly, this was generally accomplished by backing the tractor adjacent to the trailer or other implement and then laboriously lifting the tongue by hand to engage the aperture in the tongue with the tractor hitch. Upon arrival at the destination with the trailer or other implement, the same laborious procedure had to be performed in order to unhitch the trailer from the tractor.

In the case of tractors having a lift mechanism associated with their draw bars, the manual lifting of the trailer tongue can be avoided. However, hitches heretofore available that were associated with hydraulically-operated hitch links on tractors have not incorporated any means for taking the load off the lifting mechanism when in transporting position, thereby placing an undue strain on such mechanism and, more important, precluding the concurrent use of the hydraulic lifting mechanism of the tractor for other purposes so long as the trailer was connected thereto.

Furthermore, tractors having vertically swingable hitch links operated by a built-in hydraulic system, have heretofore required the use of a special device to lock the hitch links in a fixed vertical position to allow the hydraulic system to remain operative for the operation of other hydraulically actuated implements, such as for example, a front mounted loader. Such a locking device would then have to be removed whenever a trailer vehicle was connected to the hitch links.

Accordingly, an object of this invention is to provide a trailer hitch for a tractor whereby the hydraulic lifting mechanism of such tractor may be conveniently utilized to effect hitching or unhitching of the tractor to a trailer, without requiring the operator to get off the tractor.

Another object of this invention is to provide improved guiding and positioning means in a tractor trailer hitch whereby the connection of a trailer may be conveniently and readily made.

A further object of this invention is to provide a locking device for a trailer hitch for a tractor having hydraulically operated hitch links whereby such hitch may be secured in a raised transporting position by said locking device to substantially remove all of the vertical load from such links.

Still another object of this invention is to provide a trailer hitch for use with the hitch links of a tractor having a built-in hydraulic system for operation of such links whereby such links can be secured in an intermediate vertical position with or without a trailer vehicle connected thereto, to permit the use of the pressured hydraulic fluid of the system for actuation of a loading device or other hydraulic implement mounted on the tractor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention:

On the drawings:

Figure 1 is a perspective view of the hitch shown mounted on the rear of a tractor.

Figure 2 is a side elevational view of the trailer hitch shown partly in section.

Figure 3 is a sectional view taken on the plane 3—3 of Figure 2.

Figure 4 is a sectional view taken on the plane 4—4 of Figure 2.

Figure 5 is a detail end view of the deflecting means for guiding the tongue of the trailer to the connecting bolt of the tractor hitch and showing the stop member in such guide.

Figure 6 is a sectional view taken on the plane 6—6 of Figure 3.

As shown on the drawings:

Figure 7:
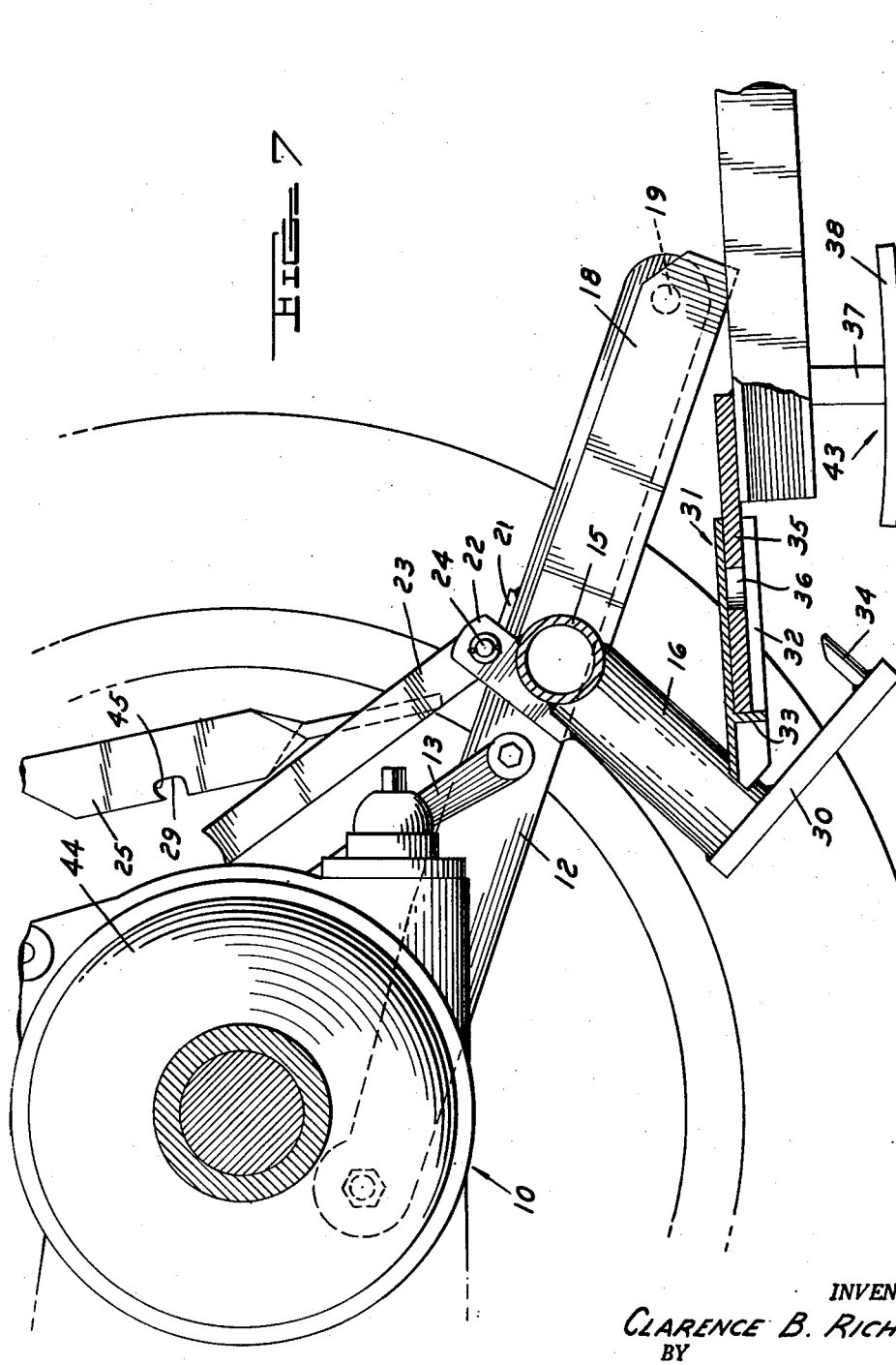
Figure 7 is a longitudinal vertical sectional view taken through the hitch showing the position of the trailer tongue just prior to making the connection thereto.

In Figure 1 the trailer hitch of this invention is shown mounted on the rear end of a tractor 10 provided with a hydraulic lifting mechanism (not shown) of well-known construction. Such mechanism includes a pair of hydraulically-operated lifting arms 11 on tractor 10 actuable by such hydraulic lifting mechanism and such arms are connected by a pair of links 13 to a pair of pivotally-mounted, opposed vertically swingable lower hitch links 12, which are mounted in trailing relation on the rear end of the tractor 10. A draw bar assemblage 14 is mounted between links 12 as shown in Figure 1 and such draw bar comprises a horizontally-disposed tube 15 having a depending arm 16 preferably welded to the center of draw bar tube 15 as shown in Figure 1. The ends of tube 15 are respectively secured as by welding to opposed rearwardly extending arms 17 and 18. Arms 17 and 18 may be conveniently formed from angle iron as shown in Figure 1, and on the rear end of each of such arms there is welded a horizontally-disposed, outwardly projecting pin 19. The free end of each lower link 12 is provided with a spherical bearing 40, each of which receives the corresponding pin 19.

Plates 20 are welded to the forward ends of arms 17 and 18 respectively and overlie the links 12 as best shown in Figure 3. Hence the draw bar assemblage 14 will follow the vertical movements of lower hitch links 12.

A pair of opposed vertically-disposed lugs 22 are welded to the top of tube 15 above arm 16. A lock 21 is pivotally secured to lugs 22 by a horizontally-disposed pin 24 supported by such lugs. Lock 21 comprises a pair of parallel strap members 23 between which is welded a latch 25. Latch 25 is provided with a notch 29 on the underside thereof and the forward end of such latch is sloped as shown at 42.

In raising hitch links 12 upwardly from the lowermost position as shown in Figure 7, the free end of straps 23 ride on the tractor differential housing 44 until the sloped end 42 of latch 25 contacts a clevis pin 27 transversely secured on mount 28, such pin being normally utilized for attaching the usual compression link member (not shown) to the control spring 26. The sloped end 42 thus cams the latch 25 away from the differential housing 44 so that the bottom of such latch will ride on pin 27 until notch 29 comes opposite pin 27, thereupon latch 25 drops inwardly towards differential housing 44 to engage such pin with a shoulder 45 on latch 25 formed by the upper end of such notch as best shown in Figure 2. The free ends of straps 23 also engage the center linkage mounting 28 when the latch is engaged with pin 27 to assist in distributing the load placed on such latch and pin.

On the bottom of depending arm 16 there is welded a horizontally-disposed plate 30 having its longest axis coincident with the center line of the tractor. A guide member 31 comprising a flared plate having downwardly turned edges 32 is welded to plate 31 at an acute angle to such plate. A cross bar 33 is provided on the inside of guide 31 as shown in Figure 1 for a purpose to be later described. A vertically-disposed hitch pin or pintle 34 is welded or otherwise secured near the rear edge of plate 30.

The cooperating hitch elements on the trailer vehicle constitute a tongue indicated in dotted outline in Figure 1 to which a horizontal plate 35 is welded and such plate is provided with a vertical hole 36 to accept pin 34. A stand 43, comprising a vertically-disposed channel iron 37 welded to a foot member 38, is welded to the underside of the trailer tongue to support plate 35 at a substantial distance from the ground in order that hitch pin 34 may be readily brought underneath such plate for connection thereto by the hydraulically operated hitch links of the tractor as will be presently described.

In the operation of the tractor hitch of this invention, draw bar tube 15 is lowered sufficiently by manipulation of the conventional hydraulic control so that hitch pin 32 will clear the underside of plate 35. The tractor is then maneuvered rearwardly so that the forward end of plate 35 will enter guide 31, whereupon the tube is raised and the tractor moved rearwardly until the forward end of plate 35 strikes cross bar 33 of guide 31. Hole 36 in plate 35 will then be aligned with pin 34 whereupon the hydraulic lifting mechanism is actuated to raise the hitch, and thus raise the tongue of the vehicle off the ground into a carrying position, meanwhile engaging pin 34 with hole 36. In the course of raising the hitch, latch 25 in engaged with clevis pin 27, whereupon the tube 15 is locked in the position shown in Figure 1. Draw bar tube 15 can then be neither raised to a greater height nor lowered until latch 25 is manually released, the engagement of straps 22 with mounting 28 at 41 assisting in preventing further upward movement and engagement of latch 25 with pin 27 preventing lowering of the hitch.

Thus in the transporting position of draw bar 15, the lock 21 transfers the entire load carried by such draw bar to pin 27. As the hydraulic lifting mechanism is not raised to its fullest extent, the control valve (not shown) of such mechanism is not fully closed thereby permitting the use of the pressured fluid of the hydraulic system for actuation of other attachments or implements that may be mounted on the tractor, such as a front mounted hydraulically-operated loader, without adverse effect on the trailer hitch. Of course, the latch 25 may be utilized to lock the lifting arms 11 at any time, irrespective of whether a trailer vehicle is attached.

From the above description of a preferred embodiment of this invention, it will be readily appreciated that there is herein disclosed a hitch for use with the hydraulically operated hitch links of a tractor that enables the operator of the tractor to conveniently and quickly attach a trailed vehicle or implement to the tractor without resort to manual effort other than manipulation of the conventional hydraulic control. The trailed vehicle is automatically and positively locked to the tractor vehicle when the hitch is raised to the transporting position. Not only does the novel locking member support the hitch in the loaded and transporting position and relieve the hydraulic system of such load, but the hydraulic system may be utilized for actuation of other devices mounted on the tractor, such as a front end loader or crane. It should also be noted that the hitch is readily assembled or disassembled to the lifting mechanism without the use of any tools.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In combination with a tractor having a laterally spaced pair of hydraulically operated hitch links and a centrally disposed compression link connection pin, a hitch comprising a draw bar, means for mounting said draw bar on said hitch links, a lock member pivotally mounted on said draw bar, latch means on said lock member automatically engageable with said connection pin as said hitch links are raised to lock said hitch links in said raised position, and means on said draw bar for connection to a trailed device.

2. The combination with a tractor having a hydraulic system including a hitch link operable by said hydraulic system between a lowered position and an extreme raised position, and a compression link connection pin on the tractor, of a hitch comprising a draw bar, means for mounting said draw bar on said hitch link, and means on said draw bar engageable with said connection pin in a raised position of said hitch link to lock said hitch link against vertical movements.

3. The combination with a tractor having a hydraulic system including a pair of hitch links vertically operable by said hydraulic system, and a compression link connection pin on the tractor, of a trailer hitch for attachment to a trailed vehicle comprising a draw bar, means for mounting said draw bar transversely on said hitch links, a lock member pivotally mounted on said draw bar, said lock member being constructed and arranged to engage said connection pin in a raised position of said hitch links, and means depending from said draw bar for connection to the trailed vehicle.

4. A trailer hitch for a tractor having transversely spaced, vertically swingable draw bars, a centrally disposed link connection pin and hydraulic means for raising said draw bars, comprising, in combination, a generally U-shaped frame, means for respectively securing the arm portions of said frame to said draw bars, a hitching member depending from the bight portion of said frame, a latch member pivotally secured to said bight portion and having its free end portion abutting the tractor adjacent to said link connection pin, said latch member having a locking notch engageable with said link connection pin as said draw bars are raised, thereby locking said frame in an elevated position independently of further operation of said hydraulic means.

5. In a trailer hitch for a tractor having a pair of hydraulically operated, vertically swingable lifting links, the improvement comprising a draw bar adapted for mounting on the links, a depending arm on said draw bar, a plate member horizontally secured to said depending arm, a vertical pintle on said plate spaced rearwardly of said arm, a guide member secured to said depending arm in alignment with said pintle, and means in said guide member for aligning the tongue of the trailer with said pintle for connection therewith.

6. In a hitch for a trailed vehicle provided with an apertured tongue for connection to a tractor having a pair of hydraulically operated lifting links vertically swingable between a low and a high position, the improvement comprising a draw bar adapted for mounting on the links, a depending arm on said draw bar, a plate member horizontally secured to said depending arm, a vertical pintle on said plate spaced rearwardly of said arm, a rearwardly flared guide member secured to said depending arm, said guide member being inclined upwardly from said arm, and a transverse bar in said guide member, said bar being constructed and arranged to contact the end of the tongue in the low position of the lifting links for alignment of the aperture in the tongue with the pintle, whereby said pintle projects into the tongue aperture in the raised position of the lifting links.

7. A trailer hitch for a tractor having vertically swingable, transversely spaced draw bars and hydraulic means for raising said draw bars, comprising, in combination, a hitching member support, means for mounting said hitching member on said draw bars in a central position relative thereto, whereby said hitching member is movable with said draw bars, means on the tractor defining a latching abutment, a latch member on said support means automatically engageable with said latching abutment as said draw bars are raised, thereby locking said draw bars in a fixed vertical position, a depending arm on said draw bar, a plate member horizontally secured to said depending arm, a vertical pintle on said plate spaced rearwardly of said arm, a rearwardly flared guide member secured to said depending arm, said guide member being inclined upwardly from said arm, and a transverse bar in said guide member, said bar being constructed and arranged to contact the end of the tongue in the low position of the lifting links for alignment of the aperture in the tongue with the pintle, whereby said pintle projects into the tongue aperture in the raised position of the lifting links.

CLARENCE B. RICHEY.

REFERENCES CITED

The following references are of record in the file of this patent:

UNITED STATES PATENTS

| Number | Name | Date |
|---|---|---|
| 2,375,970 | Williams | May 15, 1945 |
| 2,413,807 | Warne | Jan. 7, 1947 |